US011525047B2

(12) United States Patent
Collias et al.

(10) Patent No.: US 11,525,047 B2
(45) Date of Patent: Dec. 13, 2022

(54) RECYCLING OF SUPERABSORBENT POLYMER WITH AN EXTENSIONAL FLOW DEVICE

(71) Applicant: The Procter & Gamble Company, Cincinnati, OH (US)

(72) Inventors: Dimitris Ioannis Collias, Mason, OH (US); John Andrew McDaniel, West Chester, OH (US); Gary Wayne Gilbertson, Liberty Township, OH (US); Martin Ian James, Hamilton, OH (US); Arsen Arsenov Simonyan, Schwalbach (DE)

(73) Assignee: The Procter & Gamble Company, Cincinnati, OH (US)

( * ) Notice: Subject to any disclaimer, the term of this patent is extended or adjusted under 35 U.S.C. 154(b) by 362 days.

(21) Appl. No.: 16/999,127

(22) Filed: Aug. 21, 2020

(65) Prior Publication Data

US 2021/0054163 A1 Feb. 25, 2021

Related U.S. Application Data

(60) Provisional application No. 62/890,631, filed on Aug. 23, 2019.

(51) Int. Cl.
*C08J 11/16* (2006.01)
*C08L 33/02* (2006.01)

(52) U.S. Cl.
CPC ............... *C08J 11/16* (2013.01); *C08L 33/02* (2013.01); *C08J 2335/02* (2013.01)

(58) Field of Classification Search
CPC ......... C08J 11/16; C08J 2335/02; C08L 33/02

USPC ........................................................ 521/40.5
See application file for complete search history.

(56) References Cited

U.S. PATENT DOCUMENTS

| | | | |
|---|---|---|---|
| 5,244,934 A | 9/1993 | Umeda et al. | |
| 6,143,820 A | 11/2000 | Klier | |
| 8,383,746 B2 | 2/2013 | Torii | |
| 8,517,595 B2 | 8/2013 | Morrison, Jr. | |
| 9,095,853 B2 | 8/2015 | Somma | |
| 9,156,034 B2 | 10/2015 | Somma | |
| 9,822,203 B2 | 11/2017 | Haag | |
| 9,850,192 B2 * | 12/2017 | Harris | ...................... C12P 7/625 |
| 11,154,839 B2 * | 10/2021 | Collias | ................. B01J 20/3441 |
| 11,396,587 B2 * | 7/2022 | Banaszak Holl | ........ C08J 7/123 |
| 2009/0003123 A1 | 1/2009 | Morrison, Jr. et al. | |
| 2011/0210469 A1 | 9/2011 | Keller | |

(Continued)

FOREIGN PATENT DOCUMENTS

| | | |
|---|---|---|
| JP | H09249711 A | 9/1997 |
| WO | 0035966 A1 | 6/2000 |

OTHER PUBLICATIONS

Shukla et al. "Photo, Thermal, and Ultrasonic Degradation of EGDMA-Crosslinked Poly(acrylic acid-co-sodium acrylate-co-acrylamide) Superabsorbents", Journal of Applied Polymer Science, (2012), vol. 125, pp. 630-639. (Year: 2012).*

(Continued)

*Primary Examiner* — Michael M. Bernshteyn
(74) *Attorney, Agent, or Firm* — James E Oehlenschlager

(57) ABSTRACT

Poly(acrylic acid)-based superabsorbent polymer (SAP) in a feed stream is converted into poly(acrylic acid) (PAA) in an extensional flow device. The total energy used to degrade the SAP into PAA is less than about 50 MJ/kg SAP.

16 Claims, 3 Drawing Sheets

(56) References Cited

U.S. PATENT DOCUMENTS

| | | |
|---|---|---|
| 2017/0095792 A1 | 4/2017 | Kim et al. |
| 2017/0166707 A1 | 6/2017 | Jang et al. |
| 2017/0198105 A1 | 7/2017 | Lee et al. |
| 2021/0053028 A1 | 2/2021 | Collias et al. |
| 2021/0054164 A1 | 2/2021 | Banaszak Holl et al. |

OTHER PUBLICATIONS

Prajapat et al. "Intensification of depolymerization of polyacrylic acid solution using different approaches based on ultrasound and solar irradiation with intensification studies", Ultrasonics Sonochemistry, 32 (2016), pp. 290-299. (Year: 2016).*

International Search Report and Written Opinion; Application No. PCT/US2020/070439; dated Oct. 9, 2020; 10 pages.

Basedow et al., "Ultrasonic Degradation of Polymers in Solution", Advances in Polymer Science, vol. 22, 1977, pp. 83-148.

Caruso et al., "Mechanically-Induced Chemical Changes in Polymeric Materials", Chem. Rev. 2009, vol. 109, pp. 5755-5798.

Dubinsky et al., "Thermal Degradation of poly(acrylic acid) Containing Copper Nitrate", Polymer Degradation and Stability, vol. 86, 2004, pp. 171-178.

Ebrahim et al., "The Study of Ultrasonic Degradation of Superabsorbent Hydrogels", vol. 2012, Article ID 343768, 05 pages.

Gurkaynak et al., "High-Temperature Degradation of Polyacrylic Acid in Aqueous Solution", Journal of Polymer Science Part A: Polymer Chemistry, vol. 34, 1996, pp. 349-355.

Kaczmarek et al., "Photo-Oxidative Degradation of Some Water-Soluble Polymers in the Presence of Accelerating Agents", Die Angewandte Makromolekulare Chemie 261/262, 1998, pp. 109-121.

Le'pine et al., "Thermal Degradation of Polyacrylic Acid in Dilute Aqueous Solution", Polymer Degradation and Stability, vol. 75, 2002, pp. 337-345.

Li et al., "Ultraviolet-Induced Decomposition of Acrylic Acid-Based Superabsorbent Hydrogels Crosslinked with N,N-Methylenebisacrylamide", Department of Chemistry and Chemical Engineering, Zhongkai University, Guangzhou, CN, Aug. 10, 2007, 7 pages.

Linden et al., "Photooxidative Degradation of Polymers by HO and HO2 Radicals Generated During the Photolysis of H2O2, FeCl3, and Fenton Reagents", Coordination Chemistry Reviews, 125 (1993) pp. 195-217.

McGaugh et al., "The Thermal Degradation of Poly(Acrylic Acid)", Polymer Letters, vol. 5, 1967, pp. 817-820.

McNeill et al, "Thermal Stability and Degradation Mechanisms of Poly(Acrylic Acid and its Salts: Part 1—Poly(Acrylic Acid)", Polymer Degradation and Stability, 29 (1990), pp. 233-246.

McNeill et al., "Thermal Stability and Degradation Mechanisms of Poly(Acrylic Acid) and its Salts: Part 2—Sodium and Potassium Salts", Polymer Degradation and Stability, vol. 30, 1990, pp. 213-230.

McNeill et al., "Thermal Stability and Degradation Mechanisms of Poly(Acrylic Acid) and its Salts: Part 3—Magnesium and Calcium Salts", Polymer Degradation and Stability, vol. 30, 1990, pp. 267-282.

Mierzwa et al., "UV-Hydrogen Peroxide Processes", Advanced Oxidation Processes for Wastewater Treatment, Chapter 2, University of Sao Paulo, Sao Paulo SP Brazil, 2018, 36 pgs.

Prajapat et al., "Intensification of Depolymerization of Polyacrylic Acid Solution Using Different Approaches Based on Ultrasound and Solar Irradiation with Intensification Studies", Ultrasonics Sonochemistry, vol. 32, 2016, pp. 290-299.

Saita et al., "Degradation of Sodium-Polyacrylate in Dilute Aqueous Solution II", Japanese Journal of Applied Physics, vol. 22, No. 8, Aug. 1983, pp. 1310-1314.

Shukla et al, "Ultrasonic Degradation of Poly(acrylic acid)", Journal of Applied Polymer Science, vol. 112, 2009, pp. 991-997.

Shukla et al., "Oxidative and Photooxidative Degradation of Poly(acrylic acid)", Polymer Degradation and Stability, vol. 94, 2009, pp. 1238-1244.

Shukla et al., "Photo, Thermal and Ultrasonic Degradation of EGDMA-Crosslinked Poly(acrylic acid-co-sodium acrylate-co-acrylamide) Superabsorbents", Journal of Applied Polymer Science DOI 10.1002, Dept. of Chemical Engineering, Indian Institute of Science, 2011, pp. 630-639.

All Office Actions; U.S. Appl. No. 17/341,476, filed Jun. 8, 2021.
All Office Actions; U.S. Appl. No. 17/341,479, filed Jun. 8, 2021.
Unpublished U.S. Appl. No. 17/341,476, filed Jun. 8, 2021, to first inventor Dimitris Ioannis Collias.
Unpublished U.S. Appl. No. 17/341,479, filed Jun. 8, 2021, to first inventor Dimitris Ioannis Collias.
All Office Actions, U.S. Appl. No. 16/548,873.
All Office Actions, U.S. Appl. No. 16/999,139.
U.S. Appl. No. 16/999,139, filed Aug. 21, 2020, Mark Monroe Banaszak Holl et al.
U.S. Appl. No. 16/548,873, filed Aug. 23, 2019, Dimitris Ioannis Collias et al.

* cited by examiner

RECYCLING OF SUPERABSORBENT POLYMER WITH AN EXTENSIONAL FLOW DEVICE

FIELD OF THE INVENTION

The present invention generally relates to recycling of poly(acrylic acid)-based superabsorbent polymer (SAP) using an extensional flow device at short residence times, with optional and additional cavitation. More specifically, a feed stream comprising SAP is fed into the extensional flow device and a product stream is produced, which comprises essentially poly(acrylic acid) (PAA). The concentration of SAP in the feed stream is greater than about 1 wt %, and the total energy used to convert SAP to PAA is less than about 50 MJ/kg SAP.

BACKGROUND OF THE INVENTION

Recycling of absorbent hygiene products (AHPs) (i.e., baby diapers, feminine protection pads, and adult incontinence pads) is good for the environment and needed to achieve the sustainability goals of many consumer companies. These goals are about using 100% recycled materials and having zero consumer and manufacturing waste go to landfill. In addition to these goals, successful recycling benefits the environment, stimulates the economy, improves people's health and water quality, and generates energy needed by consumers in developing regions of the world.

The major component in AHPs is typically the superabsorbent polymer (SAP), whereas other components are adhesives, cellulose fibers, polyethylene, polypropylene, and polyester. SAP is a water-absorbing, water-swellable, and water-insoluble powdered solid which is a crosslinked and partially neutralized homopolymer of glacial acrylic acid. SAP has an exceptionally high ability to absorb aqueous liquids, such as contaminated water or urine. About 97% of SAP produced today is used in AHP applications, whereas the remainder about 3% is used in other applications, such as agricultural or horticultural water-retaining agents, and industrial waterproofing agents.

Recycling of AHPs involves cleaning of the AHPs from the soils accumulated during their use and separating the various components into recycled material streams. More specifically, the recycled SAP material stream can be used in applications less demanding than AHPs (since the recycled SAP has inferior properties compared to virgin SAP; for example, agricultural or horticultural water-retaining agents, and industrial waterproofing agents) and/or can be converted to essentially non-crosslinked, and slightly branched or linear poly(acrylic acid) (PAA). Then, this PAA can be used as a feed material to various applications. For example, the PAA can be: 1) used as-is in applications such as water treatment or corrosion inhibition; or 2) esterified and then used in adhesives, coatings, etc.; or 3) re-polymerized and re-crosslinked back to SAP; or 4) blended with virgin SAP. The first two sets of applications are part of the effort to recycle SAP into other products by replacing virgin acrylic-acid-based compounds with compounds derived from recycled SAP, whereas the last two sets of applications are part of the circular economy of SAP, i.e., recycling SAP back to SAP. In all cases, the objective is to achieve the same properties as virgin materials.

Non-limiting examples of processes that produce purified and separated material streams of used SAP from recycled AHPs are disclosed and claimed in U.S. Pat. No. 9,095,853 B2, issued on Aug. 4, 2015; and U.S. Pat. No. 9,156,034 B2, issued on Oct. 13, 2015; both assigned to Fater S.p.A, based in Pescara, Italy.

Most SAPs are based on poly(acrylic acid) and are crosslinked network materials. Non-limiting examples of procedures used to produce SAPs from glacial acrylic acid and crosslinkers are disclosed in U.S. Pat. No. 8,383,746 B2, issued on Feb. 26, 2013, and assigned to Nippon Shokubai Co., Ltd, based in Osaka, Japan; and U.S. Pat. No. 9,822,203 B2, issued on Nov. 21, 2017, and assigned to BASF SE, based in Ludwigshafen, Germany.

Ultrasonic degradation of SAP is described in: (1) Ebrahimi, R., et al., *Organic Chemistry Intl*, 2012, Article ID 343768, 5 pages; and (2) Shukla, N. B., and Madras, G., *J. Appl. Polym. Sci.*, 125 (2012), 630-639. Ultrasonic degradation of PAA is described in: (1) Shukla, N. B., et al., *J. Appl. Polym. Sci.*, 112 (2009), 991-997; and (2) Prajapat, A. L., and Gogate, P. R., *Ultrason. Sonochem.*, 32 (2016), 290-299. Also, a general description of ultrasonic degradation of polymers in solution is given in: Basedow, A. M., and Ebert, K. H., *Adv. Polym. Sci.*, 22 (1977), 83-148.

For the degradation of SAPs, both references used viscosity as a measure of the degradation level and found that it takes about 5 to 10 min to reduce the viscosity by one order of magnitude, e.g. from 10 Pa·s to 1 Pa·s, which indicates that a lot of energy is needed to achieve that level of degradation. For the degradation of linear polymers, the main themes from these references (as well as other references that report on the use of UV, thermal, and other forms of energy) are that the (1) preferential scission is at the mid-point of the polymer chain, (2) the higher molecular weight chains are degraded at a higher rate than the lower molecular weight chains, and (3) there is a minimum molecular weight below which degradation or de-polymerization does not occur. In all cases, the ultrasonic degradation of polymers is due to cavitation, and fast growth and collapse of the resulting microbubbles.

Accordingly, there is a need to recycle AHPs and their major component, which is SAP. For the recycling of SAP, there is a need to degrade SAP into poly(acrylic acid) (PAA), in short time scale; with low energy and power per unit mass of SAP; and at mild conditions, such as room temperature, thus avoiding decarboxylation of the degraded SAP. The requirement for low energy per unit mass of SAP stems from the fact that the recycling of used SAP and its degradation to PAA is beneficial only if the energy spent during the converting of SAP to PAA is less than that used to make fossil-derived acrylic acid (petro-AA) from propylene, which is about 50 MJ/kg AA. The PAA produced from SAP can then be incorporated back into virgin SAP (thus increasing its recycled content and supporting the circular economy of SAP) and/or derivatized into materials for other applications, such as, adhesives, coatings, water treatment, fabric care, etc.

SUMMARY OF THE INVENTION

In one embodiment of the present invention, a method for degrading a superabsorbent polymer (SAP) to poly(acrylic acid) (PAA) is presented. The method comprises flowing a feed stream comprising said SAP into an inlet of an extensional flow device and producing a product stream comprising said PAA at an outlet of said extensional flow device; wherein said feed stream comprises said SAP at a concentration greater than about 1 wt %; wherein said feed stream has a residence time in said extensional flow device of less than about 120 s; and wherein said degradation of said SAP to said PAA requires a total energy of less than about 50 MJ/kg SAP.

In another embodiment of the present invention, a method for degrading a superabsorbent polymer (SAP) to poly (acrylic acid) (PAA) is presented. The method comprises flowing a feed stream comprising said SAP into an inlet of an extensional flow device and producing a product stream comprising PAA at an outlet of said extensional flow device; wherein said feed stream comprises water and said SAP at a concentration greater than about 1 wt %; wherein said feed stream has a residence time in said extensional flow device of less than about 120 s; wherein said degradation of said SAP to said PAA requires a total energy of less than about 16 MJ/kg SAP; and wherein said PAA has a weight-average molecular weight less than about 1,000,000 g/mol.

In yet another embodiment of the present invention, a method for degrading a superabsorbent polymer (SAP) to poly(acrylic acid) (PAA) is presented. The method comprises flowing a feed stream comprising said SAP into an inlet of an extensional flow device and producing a product stream comprising PAA at an outlet of said extensional flow device; wherein said feed stream comprises water and said SAP at a concentration greater than about 5 wt %; wherein said feed stream has a residence time in said extensional flow device of less than about 120 s; wherein said degradation of said SAP to said PAA requires a total energy of less than about 16 MJ/kg SAP; and wherein said PAA has a weight-average molecular weight less than about 1,000,000 g/mol.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I DEFINITIONS

Figure 1:
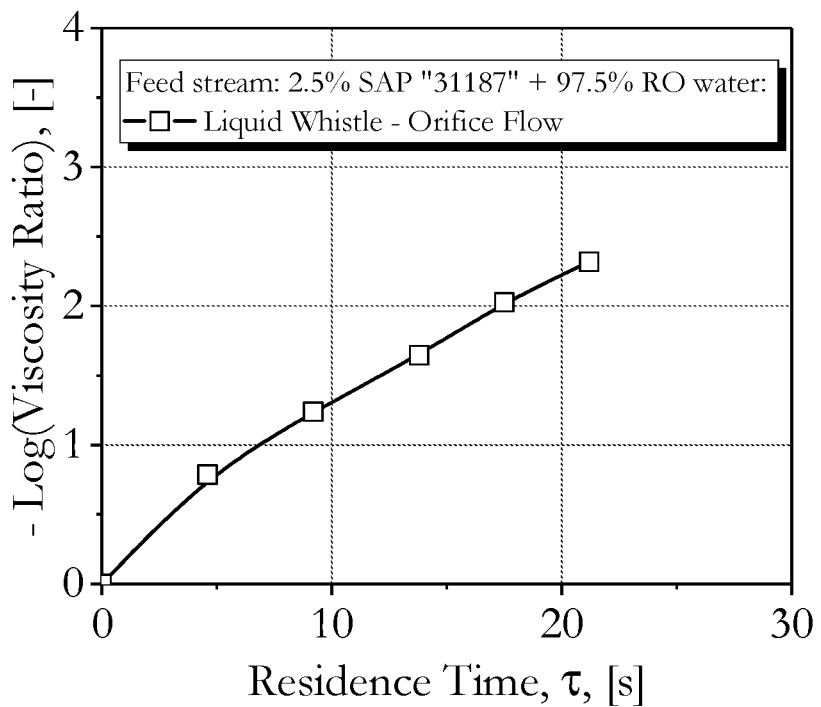
FIG. 1 is a graph showing the negative logarithm of the viscosity ratio between the feed and product streams as a function of the residence time of the feed stream in the Liquid Whistle, with only the orifice and without hydrodynamic cavitation (i.e., the blade was not engaged), and for the 2.5 wt % SAP and 97.5 wt % reverse osmosis (RO) water feed stream.

As used herein, the term "SAP" refers to crosslinked, partially neutralized, and poly(acrylic acid)-based superabsorbent polymer. SAP examples are disclosed in U.S. Pat. Nos. 8,383,746 B2 and 9,822,203 B2. Typically, SAP is capable of absorbing a 0.9 wt % saline solution at 25° C. at least 10 times its dry weight. The typical absorption mechanism is osmotic pressure. SAP that absorbs water or aqueous solutions becomes a gel.

As used herein, the term "degree of neutralization" or "DN" refers to the mol percentage of the acid groups in SAP or PAA that are neutralized by the reaction with a base (typically, sodium hydroxide). A typical method to measure the DN of an SAP is to measure the Na content using the Inductively Coupled Plasma (ICP) analytical technique, as it is well known to those skilled in the art. If the amount of Na is wt % (Na), then the degree of neutralization is calculated as DN=100×72/((23×100/wt % (Na))−22).

As used herein, the term "poly(acrylic acid)" or "PAA" or "polymer of acrylic acid" refers to an essentially non-crosslinked, and either slightly branched or linear poly (acrylic acid) molecule with acrylic acid as the monomeric unit and degree of polymerization that can be 2 or higher. For the purposes of the present invention, there will be no difference between a polymer of acrylic acid and an oligomer of acrylic acid.

As used herein, the term "degradation" refers to the conversion of SAP into PAA via the actions of partial de-polymerization, de-crosslinking, molecular backbone breaking, or any combination of the above actions. For the purposes of the present invention, the terms degradation, recycling, and conversion are used interchangeably, as long as they refer to the transformation of SAP to PAA. Also, the degradation essentially preserves the carboxylic groups of the SAP and thus the product PAA contains those carboxylic groups. Note that full de-polymerization of SAP should lead to acrylic acid (AA).

As used herein, the term "virgin SAP" refers to SAP produced from virgin glacial acrylic acid, which is the feedstock used today to make SAP. Virgin acrylic acid can be produced from either fossil-derived propylene or other bio-derived materials (non-limiting examples of bio-materials are: lactic acid, 3-hydroxypropionic acid, glycerin, bio-propylene, carbon dioxide, and sugar). Virgin SAP does not include any recycled SAP above about 1 wt %.

As used herein, the term "used SAP" refers to SAP which has already been produced industrially and/or used commercially, for example, in a baby diaper, feminine pad, adult incontinence pad, or other articles and/or uses. Used SAP can be post-consumer SAP, post-industrial SAP, or combinations of both. Unless otherwise noted in this invention, SAP refers to either "used SAP" or "virgin SAP".

As used herein, the term "degraded SAP" refers to SAP which has been degraded to PAA. For the purposes of the present invention, the terms "degraded SAP" and "PAA" are used interchangeably.

As used herein, the term "recycled SAP" refers to SAP which contains at least 1 wt % degraded SAP (or equivalently, PAA) that has been incorporated into the SAP while the SAP is being produced from glacial acrylic acid using the typical production method. Thus, the recycled SAP is a blend of virgin SAP and at least 1 wt % degraded SAP.

As used herein, the term "feed stream" refers to a body of fluid that flows in a specific direction and feeds into an inlet of an extensional flow device.

As used herein, the term "product stream" refers to a body of fluid that is produced at an outlet of an extensional flow device when the feed stream is fed into an inlet of the same device.

As used herein, the term "Liquid Whistle" refers to a Sonolator type of equipment (manufactured by the Sonic Corporation, Stratford, Conn.) which employs, in the flow direction, an inlet chamber, an orifice, and a mixing chamber with a blade in front of the orifice. Material flows through the orifice and the generated jet impinges on the blade which is then forced to vibrate at its resonant frequency and further enhance the cavitation field, if it is located within 7 to 8 times the hydraulic diameter of the orifice away from the orifice (i.e., the blade is engaged). If the blade is located outside the range of 7 to 8 times the hydraulic diameter of the orifice away from the orifice, then it is considered that the blade is not engaged. The closer to the orifice the blade is and the lower the viscosity of the feed stream is the stronger the cavitation is. The main uses of the Liquid Whistle (LW) are mixing, emulsification, deagglomeration, and disinfection in the home, personal care, and fine chemicals industries (U.S. Pat. No. 8,517,595 B2 and Ryan, D. J., et al., *Chem. Engng Sci.,* 189 (2018), 369-379). For the purposes of the present invention, LW is one of the extensional flow devices that can be used.

As used herein, the term "extensional flow device" refers to a flow device that generates extensional flow, strain, and stress. Non-limiting examples of extensional flow devices are devices with converging and/or diverging channels, orifices, impinging jets, four roll mills, screens, dies, etc. The terms "extensional" and "elongational" are used interchangeably for the purposes of the present invention.

As used herein, the terms "viscosity ratio" or "viscosity reduction ratio" refer to the ratio of the viscosity of the product stream to that of the feed stream. The viscosity of the feed stream is typically measured with a parallel plate fixture in oscillatory mode, and the complex viscosity reported typically corresponds to a frequency of 1 rad/s. The viscosity of the product stream is measured with either a cup and bob fixture in steady mode or parallel plate fixture in oscillatory mode. When the viscosity is measured with a cup and bob fixture in steady mode the viscosity reported typically corresponds to a shear rate of 4 $s^{-1}$. These viscosity measurement techniques are well known to those skilled in the art. For the purposes of the present invention, the negative of the logarithm of the viscosity ratio indicates the extent of the SAP degradation to PAA in orders of magnitude, as it is accepted by those skilled in the art that the lower the viscosity of a PAA solution the lower the molecular weight of the PAA is, at a fixed concentration.

As used herein, $M_n$ is the number average molecular weight, in g/mol or equivalently Da, $M_w$ is the weight average molecular weight, in g/mol or equivalently Da, $M_z$ is the z-average molecular weight, in g/mol or equivalently Da, and PDI is the polydispersity index defined as $M_w/M_n$.

II FEED STREAM

Unexpectedly, it has been found that SAP degrades to PAA (i.e., essentially, without decarboxylation) when the SAP feed stream (which is in the form of a gel) flows in the extensional flow device (e.g. LW) and experiences the extensional flow at short residence times. Without wishing to be bound by any theory, applicants believe that the extensional stresses generated in the SAP feed stream/gel, as it flows through the orifice, cause stretching and breaking of the cross-linker, cross-linker attachments to the backbone, and backbone bonds. Applicants expected that gels would generate slip at the walls of the inlet chamber and orifice, and thus they would not generate extensional stresses as they would flow in plug flow in the inlet chamber and orifice (as it is well known to those skilled in the art). Also, unexpectedly, it has been found that the PAA produced from the degradation of SAP with the extensional flow device has narrow Molecular Weight Distribution (MWD), i.e., low PDI. This is expected with linear polymers, but unexpected with crosslinked polymers.

The typical properties of SAP are mechanical properties, swelling capacity, saline flow conductivity (SFC), absorption against pressure (AAP; INDA test method WSP 242.2), residual monomer, extractable polymer (amount of extractables), and centrifuge retention capacity (CRC). Also, for the purposes of the present invention, the SAP can include other co-monomers, such as itaconic acid, acrylamide, etc., or other materials, such as starch, cellulosic fibers, clays, etc.

SAP is typically prepared using a homogeneous solution polymerization process or by multi-phase polymerization techniques, such as inverse emulsion or suspension polymerization. The polymerization reaction generally occurs in the presence of a relatively small amount of di- or polyfunctional monomers, such as N,N'-methylene bisacrylamide, trimethylolpropane triacrylate, (poly) ethylene glycol di(meth)acrylate, triallylamine, etc. The di- or poly-functional monomer compounds serve to lightly crosslink the acrylate polymer chains, thereby rendering the SAP waterinsoluble, yet water-swellable. Furthermore, SAP can be surface-crosslinked after polymerization by reaction with suitable crosslinking agents, such as di/poly-epoxides, di/poly-alcohols, di/poly-haloalkanes, etc. SAP is typically in particulate form, which, in the case of solution polymerization, is produced from a slab of material with any typical size reduction techniques, such as milling.

SAP can be fully un-neutralized (DN=0), fully neutralized (DN=100%), or partly neutralized. In one embodiment of the present invention, the SAP has DN greater than about 50%. In another embodiment of the present invention, the SAP has DN between about 65% and about 75%. In yet another embodiment of the present invention, the SAP has DN greater than about 75%. In even yet another embodiment of the present invention, the SAP has DN lower than about 50%.

In one embodiment of the present invention, the feed stream comprises SAP. In another embodiment of the present invention, the feed stream comprises SAP and water. In yet another embodiment of the present invention, the feed stream comprises SAP and ethylene glycol (EG). In even yet another embodiment of the present invention, the feed stream comprises SAP, water, and ethylene glycol. The water in the feed stream can be RO water, regular tap water, or water containing dissolved inorganic salts at various salt concentrations. A non-limiting example of water with salt is a 0.9 wt % solution of sodium chloride. Other salts with monovalent cations, but higher ionic strength, can be used to reduce the viscosity of the feed stream or alternatively to enable higher SAP concentration to be used. A non-limiting example of a viscosity reducing salt is sodium sulfate.

The feed stream can also comprise any free radical producing chemical compound. Non-limiting examples of such chemical compounds are hydrogen peroxide ($H_2O_2$), persulfate (such as, sodium persulfate or potassium persulfate), perborate, perphosphate, percarbonate, diazo compounds, ozone, organic free radical initiators (e.g. di-ter-butyl peroxide (DTBP)), combinations thereof, etc.

In one embodiment of the present invention, the feed stream comprises SAP and $H_2O_2$. In another embodiment of the present invention, the feed stream comprises SAP and a $H_2O_2$ solution.

In one embodiment of the present invention, the feed stream comprises SAP at a concentration greater than about 1 wt %. In another embodiment of the present invention, the feed stream comprises SAP at a concentration greater than about 5 wt %. In yet another embodiment of the present invention, the feed stream comprises SAP at a concentration greater than about 10 wt %. In even yet another embodiment of the present invention, the feed stream comprises SAP at a concentration of about 2.5 wt %. In one embodiment of the present invention, the feed stream comprises SAP at a concentration of about 5 wt %. In another embodiment of the present invention, the feed stream comprises SAP at a concentration of about 7.5 wt %. In yet another embodiment of the present invention, the feed stream comprises SAP at a concentration of about 10 wt %.

In one embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is less than about 3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is less than about 3 wt %. In yet another embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 3 wt %.

In one embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 0.3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 0.3 wt %. In yet another embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 0.03 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 0.03 wt %.

In one embodiment of the present invention, the feed comprises SAP and a $H_2O_2$ solution, and the concentration of the $H_2O_2$ in the $H_2O_2$ solution is less than about 3 wt %. In another embodiment of the present invention, the feed comprises SAP and $H_2O_2$, and the concentration of the $H_2O_2$ in the $H_2O_2$ solution is less than about 0.3 wt %. In yet another embodiment of the present invention, the feed comprises SAP and $H_2O_2$ solution, and the concentration of the $H_2O_2$ in the $H_2O_2$ solution is less than about 0.03 wt %.

The viscosity of the feed stream is typically measured with a parallel plate fixture in oscillatory mode, and the complex viscosity reported typically corresponds to a frequency of 1 rad/s. Depending on the SAP concentration the complex viscosity of the feed stream can be higher than 200 Pa·s (or equivalently, 200,000 cP). The feed stream can be in the form of a solution or gel, depending on the concentration of SAP.

The non-renewable energy use (NREU) to make acrylic acid (AA) from the fossil-derived propylene is estimated to be about 50 MJ/kg SAP (equivalently, 50 MJ/kg AA). Therefore, any successful recycling attempt of SAP needs to expend less energy than the NREU to make AA, i.e., less than about 50 MJ/kg SAP. For the purposes of the NREU, it is assumed that the SAP is fully non-neutralized (DN=0).

III EXTENSIONAL FLOW DEVICE AND CAVITATION

Typically, the feed stream is in fluid communication with the extensional flow device via a tube or a channel, and a pump. Non-limiting examples of tubes or channels are glass tubes, metal tubes, alloy tubes (such as, stainless-steel tubes), and polymer tubes. The tube or channel can have any cross-sectional shape, such as, circular, rectangular, oval, rhombic, etc. Also, the size of the cross-sectional area of the tube or channel can be the same or vary along the flow direction. A non-limiting example of a varying cross-sectional shape of a tube is an undulating tube that can cause the feed stream to experience extensional stresses as it flows down the tube. These extensional stresses might be beneficial to the degradation of the SAP that is part of the feed stream. Also, the feed stream can go through static mixers or other mixing elements placed inside the tube and/or channel that the feed stream flows through.

Non-limiting examples of pumps are centrifugal pumps (such as, axial, radial, and mixed flow pumps) and positive displacement pumps (such as, reciprocating, rotary, piston, diaphragm, gear, peristaltic, screw, and vane). The extensional flow device can employ one or more pumps.

In one embodiment of the present invention, the extensional flow device is a Liquid Whistle (LW). Typically, a LW includes, in the flow direction, an inlet chamber, an orifice, and a mixing chamber, where a blade is located in front of the orifice and at a distance from it. Also, typically, an extensional flow device includes an inlet and an outlet. The feed stream enters the extensional flow device at the inlet and the product stream exits the extensional flow device at the outlet. Non-limiting examples of extensional flow devices are the SONOLATOR® from Sonic Corp. and MICROFLUIDIZER® from Microfluidics Corp (Newton, Mass.). In one embodiment of the present invention, there is no blade downstream of the orifice in the LW.

Non-limiting configurations of the orifice are slot-shaped, eye-shaped, elliptically-shaped, circular, triangular, square, rectangular, and polygonal. The width of the orifice can be up to 1 in. (2.541 cm) or more. The height of the orifice can be up to 0.5 in. (1.27 cm) or more. In another embodiment of the present invention, the orifice is elliptically-shaped. In yet another embodiment of the present invention, the width of the orifice is about 1.9 mm and the height of the orifice is about 0.6 mm. Non-limiting examples of the materials used to make the orifice housing are stainless steel, titanium, ceramics, cemented tungsten carbide, various borides, various carbons, various carbides, and various diborides. The land length of the orifice can be up to 10 mm. In one embodiment of the present invention, the land length of the orifice is between about 0.5 mm and about 5 mm. In another embodiment of the present invention, the land length of the orifice is about 1 mm.

When the blade of a LW vibrates with its natural frequency it generates intense cavitation and the formed bubbles grow and collapse extremely fast. Non-limiting examples of the materials used to make the blade are stainless steel, titanium, ceramics, cemented tungsten carbide, various borides, various carbons, various carbides, and various diborides. The blade of a LW can have suitable configurations, such as, but not limited to, tapered, with sharpened edge or edges, rectangular or square cross section, etc. The blade of a LW can have any suitable dimensions. In one embodiment of the present invention, the length of the blade of a LW is between about 1 mm and about 100 mm. In another embodiment of the present invention, the length of the blade of a LW is between about 10 mm and about 50 mm. In yet another embodiment of the present invention, the thickness of the blade of a LW is between about 7 μm and about 100 mm. In another embodiment of the present invention, the thickness of the blade of a LW is between about 0.2 mm and about 50 mm.

The cavitation introduced by the vibrating blade of a LW can be hydrodynamic, acoustic (e.g. between 20 Hz and 20 kHz), or ultrasonic (e.g. above 20 kHz). In one embodiment of the present invention, the blade of a LW undergoes ultrasonic vibration at a frequency between about 20 kHz and about 100 kHz.

The distance between the blade and the orifice of a LW can vary from about 0.1 mm to about 25 mm. In one embodiment of the present invention, the distance between the blade and the orifice of a LW is about 0.5 mm. In another embodiment of the present invention, the distance between the blade and the orifice of a LW is between about 0.5 mm and about 13 mm. In yet another embodiment of the present invention, the distance between the blade and the orifice of a LW is between about 1 mm and about 10 mm. In even yet another embodiment of the present invention, the distance between the blade and the orifice of a LW is between about 3 mm and about 6 mm.

In one embodiment of the present invention, the blade is at a distance from the orifice of a LW so that no cavitation is achieved when the fluid jet emerges from the orifice and impinges onto the blade. In another embodiment of the present invention, the blade is at a distance from the orifice of a LW so that cavitation is achieved when the fluid jet emerges from the orifice and impinges onto the blade. In yet another embodiment of the present invention, the cavitation achieved in the extensional flow device is hydrodynamic. In even yet another embodiment of the present invention, the cavitation achieved in the extensional flow device is ultrasonic. In one embodiment of the present invention, the cavitation achieved in the extensional flow device is acoustic.

In one embodiment of the present invention, the distance of the blade from the orifice of a LW is at least about 7 times the hydraulic diameter of the orifice. In another embodiment of the present invention, the distance of the blade from the orifice of a LW is less than about 7 times the hydraulic diameter of the orifice. In yet another embodiment of the present invention, the distance of the blade from the orifice of a LW is about 6 times the hydraulic diameter of the orifice. In even yet another embodiment of the present invention, the distance of the blade from the orifice of a LW is at about 0.3 times the hydraulic diameter of the orifice.

The process may be carried out at any suitable pressure, which is measured at the feed stream and upstream of the orifice. In one embodiment of the present invention, the pressure is between about 500 psi (34.5 bar) and about 20,000 psi (1379 bar). In another embodiment of the present invention, the pressure is higher than about 20,000 psi (1379 bar). In yet another embodiment of the present invention, the pressure is between about 1000 psi (68.9 bar) and about 10,000 psi (689.5 bar). In even yet another embodiment of the present invention, the pressure is between about 2,000 psi (137.9 bar) and about 7,000 psi (482.6 bar). In one embodiment of the present invention, the pressure is about 5,000 psi (344.7 bar).

The flowrate of the feed stream into the extensional flow device can be of any suitable value. In one embodiment of the present invention, the flowrate of the feed stream into the extensional flow device is between about 1 L/min and about 1,000 L/min. In another embodiment of the present invention, the flowrate of the feed stream into the extensional flow device is between about 2 L/min and about 500 L/min. In yet another embodiment of the present invention, the flowrate of the feed stream into the extensional flow device is between about 3 L/min and about 200 L/min. In even yet another embodiment of the present invention, the flowrate of the feed stream into the extensional flow device is between about 4 L/min and about 100 L/min. In one embodiment of the present invention, the flowrate of the feed stream into the extensional flow device is about 5 L/min.

The residence time of the feed stream in the extensional flow device can be of any suitable value. The residence time is defined as the average time the feed stream spends in the extensional flow device as a whole, not only in the orifice nor in the inlet and mixing chambers only. In one embodiment of the present invention, the residence time of the feed stream in the extensional flow device is less than about 120 s. In another embodiment of the present invention, the residence time of the feed stream in the extensional flow device is less than about 60 s. In yet another embodiment of the present invention, the residence time of the feed stream in the extensional flow device is less than about 15 s. In one embodiment of the present invention, the residence time of the feed stream in the extensional flow device is between about 1.5 s and about 50 s. In another embodiment of the present invention, the residence time of the feed stream in the extensional flow device is between about 2 s and about 20 s. In yet another embodiment of the present invention, the residence time of the feed stream in the extensional flow device is between about 2.5 s and about 10 s. In even yet another embodiment of the present invention, the residence time of the feed stream in the extensional flow device is between about 3 s and 5 s.

The residence time of the feed stream in the orifice of the extensional flow device can be of any suitable value. In one embodiment of the present invention, the residence time of the feed stream in the orifice is between about 1 µs and about 100 µs. In another embodiment of the present invention, the residence time of the feed stream in the orifice is between about 2 µs and about 50 µs. In yet another embodiment of the present invention, the residence time of the feed stream in the orifice is between about 5 µs and about 20 µs. In even yet another embodiment of the present invention, the residence time of the feed stream in the orifice is between about 7 µs and about 15 µs. In one embodiment of the present invention, the residence time of the feed stream in the orifice is about 11 µs.

The total energy is the electric energy that is supplied to the extensional flow device and is based on the voltage and amperage of the device, and the residence time of the feed stream. The specific energy is the energy that is dissipated in the feed stream inside the extensional flow device, it is used to convert SAP to PAA, and is based on the pressure drop in the feed stream as it flows through the extensional flow system. The calculations for the total energy and specific energy are exemplified in the Methods section VII (as they are well known to those skilled in the art).

In one embodiment of the present invention, the specific energy used to convert SAP to PAA is less than about 30 MJ/kg SAP. In another embodiment of the present invention, the specific energy used to convert SAP to PAA is less than about 20 MJ/kg SAP. In yet another embodiment of the present invention, the specific energy used to convert SAP to PAA is less than about 10 MJ/kg SAP. In even yet another embodiment of the present invention, the specific energy used to convert SAP to PAA is less than about 5 MJ/kg SAP. In one embodiment of the present invention, the specific energy used to convert SAP to PAA is less than about 1 MJ/kg SAP.

In one embodiment of the present invention, the total energy used to convert SAP to PAA is less than about 50 MJ/kg SAP. In another embodiment of the present invention, the total energy used to convert SAP to PAA is less than about 32 MJ/kg SAP. In yet another embodiment of the present invention, the total energy used to convert SAP to PAA is less than about 16 MJ/kg SAP. In even yet another embodiment of the present invention, the total energy used to convert SAP to PAA is less than about 10 MJ/kg SAP. In one embodiment of the present invention, the total energy used to convert SAP to PAA is less than about 2 MJ/kg SAP.

The extensional flow can take place at room temperature or any other temperature. Furthermore, the extensional flow can be preceded or followed by other processes, such as microwave heating, UV irradiation, IR heating, ultrasonic/cavitation, extrusion, extensional stretching, etc.

IV PRODUCT STREAM

The feed stream flows into the inlet of the extensional device and produces a product stream at the outlet of the extensional flow device. In one embodiment of the present invention, the product stream comprises PAA. In another embodiment of the present invention, the product stream comprises PAA and SAP.

In one embodiment of the present invention, the PAA has a weight-average molecular weight less than about 5,000,000 g/mol. In another embodiment of the present invention, the PAA has a weight-average molecular weight less than about 2,000,000 g/mol. In yet another embodiment of the present invention, the PAA has a weight-average molecular weight less than about 1,000,000 g/mol. In even yet another embodiment of the present invention, the PAA has a weight-average molecular weight less than about 500,000 g/mol. In one embodiment of the present invention, the PAA has a weight-average molecular weight less than about 300,000 g/mol. In another embodiment of the present invention, the PAA has a weight-average molecular weight less than about 200,000 g/mol. In yet another embodiment of the present invention, the PAA has a weight-average molecular weight less than about 100,000 g/mol. In even yet another embodiment of the present invention, the PAA has a weight-average molecular weight less than about 30,000 g/mol.

In one embodiment of the present invention, the PAA has a weight-average molecular weight between about 1,000,000 g/mol and about 5,000,000 g/mol. In another embodiment of the present invention, the PAA has a weight-average molecular weight between about 500,000 g/mol and about 2,000,000 g/mol. In yet another embodiment of the present invention, the PAA has a weight-average molecular weight between about 100,000 g/mol and about 1,000,000 g/mol. In even yet another embodiment of the present invention, the PAA has a weight-average molecular weight between about 150,000 g/mol and about 500,000 g/mol. In one embodiment of the present invention, the PAA has a weight-average molecular weight between about 90,000 g/mol and about 300,000 g/mol. In another embodiment of the present invention, the PAA has a weight-average molecular weight between about 20,000 g/mol and about 200,000 g/mol. In yet another embodiment of the present invention, the PAA has a weight-average molecular weight between about 10,000 g/mol and about 100,000 g/mol.

In one embodiment of the present invention, the PAA has a polydispersity index (PDI) less than about 10. In another embodiment of the present invention, the PAA has a PDI less than about 6. In yet another embodiment of the present invention, the PAA has a PDI less than about 4. In even yet another embodiment of the present invention, the PAA has a PDI less than about 2. PDI is the ratio of the weight-average molecular weight to the number-average molecular weight, and these molecular weights are measured by GPC (described in the Methods section VII) as it is known to those skilled in the art.

The viscosity of the product stream is typically measured with either a parallel plate fixture in oscillatory mode or a cup and bob fixture in steady mode. The oscillatory viscosity reported typically corresponds to 1 rad/s, and the steady viscosity reported typically corresponds to a shear rate of 4 $s^{-1}$. Depending on the PAA concentration and molecular weight, the viscosity of the product stream can be as low as 1 mPa·s (or equivalently, 1 cP; i.e., the viscosity of water).

The ratio of the viscosity of the product stream to the viscosity of the feed stream is the viscosity reduction ratio (or simply, viscosity ratio). It indicates the extent of the SAP degradation to PAA by the UV flow system. The negative logarithm of the viscosity ratio measures the orders of magnitude change between the viscosity of the feed stream and the product stream. In one embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 6. In another embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 4. In yet another embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 2.

PAA from the product stream can be derivatized into materials for various applications, such as, adhesives, coatings, water treatment, etc. In one embodiment of the present invention, PAA from the product stream, either as is or derivatized, is used as an adhesive. In yet another embodiment of the present invention, PAA from the product stream, either as is or derivatized, is used in fabric care applications. In even yet another embodiment of the present invention, PAA from the product stream, either as is or derivatized, is used in water treatment applications.

In one embodiment of the present invention, PAA from the product stream is used as a ply glue in paper products. In another embodiment of the present invention, PAA from the product stream is used as a ply glue in paper towel products. In yet another embodiment of the present invention, PAA from the product stream is used as a ply glue in toilet paper products. In even yet another embodiment of the present invention, PAA from the product stream is used as ply glue in paper products has $M_w$ greater than about 350 kDa. In one embodiment of the present invention, PAA from the product stream is used as ply glue in paper products has $M_w$ between about 400 kDa and about 500 kDa.

In another embodiment of the present invention, PAA from the product stream is used as a glue between the paper core and paper towel products. In even another embodiment of the present invention, PAA from the product stream is used as a glue between the paper core and toilet paper products.

PAA can be extracted from the product stream via a number of processes. Non-limiting examples of these processes are water evaporation, PAA filtration, water extraction, etc. Also, salts present in the product stream from the use of SAP in AHPs can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc.

V RECYCLED SAP

PAA from the product stream can be fed into the process to make SAP from glacial acrylic acid, thus producing recycled SAP. EXAMPLES 21 and 23 show the incorporation of PAA into virgin SAP. In one embodiment of the present invention, the PAA is used to produce a recycled SAP.

In one embodiment of the present invention, the SAP comprises PAA at a concentration, and wherein the PAA concentration is less than about 60 wt %. In another embodiment of the present invention, the SAP comprises PAA at a concentration, and wherein the PAA concentration is less than about 50 wt %. In yet another embodiment of the present invention, the SAP comprises PAA at a concentration, and wherein the PAA concentration is less than about 45 wt %. In even yet another embodiment of the present invention, the SAP comprises PAA at a concentration, and wherein the PAA concentration is less than about 40 wt %. In one embodiment of the present invention, the SAP comprises PAA at a concentration, and wherein the PAA concentration is less than about 30 wt %. In another embodiment of the present invention, the SAP comprises PAA at a concentration, and wherein the PAA concentration is less than about 20 wt %. In yet another embodiment of the present invention, the SAP comprises PAA at a concentration, and wherein the PAA concentration is less than about 15 wt %. In even yet another embodiment of the present invention, the SAP comprises PAA at a concentration, and wherein the PAA concentration is less than about 10 wt %.

In one embodiment of the present invention, the recycled SAP has an amount of extractables, and wherein the amount of extractables is less than about 20 wt %. In another embodiment of the present invention, the recycled SAP has an amount of extractables, and wherein the amount of extractables is less than about 15 wt %. In yet another embodiment of the present invention, the recycled SAP has an amount of extractables, and wherein the amount of extractables is less than about 10 wt %. In even yet another embodiment of the present invention, the recycled SAP has an amount of extractables, and wherein the amount of extractables is less than about 7 wt %.

In one embodiment of the present invention, the recycled SAP has a swelling ratio, and wherein the swelling ratio is greater than about 50 g/g. In another embodiment of the present invention, the recycled SAP has a swelling ratio, and wherein the swelling ratio is greater than about 45 g/g. In yet another embodiment of the present invention, the recycled SAP has a swelling ratio, and wherein the swelling ratio is greater than about 40 g/g. In even yet another embodiment of the present invention, the recycled SAP has a swelling ratio, and wherein the swelling ratio is greater than about 35 g/g.

In one embodiment of the present invention, the recycled SAP has a swelling ratio, and wherein the swelling ratio is about 50 g/g. In another embodiment of the present invention, the recycled SAP has a swelling ratio, and wherein the swelling ratio is about 45 g/g. In yet another embodiment of the present invention, the recycled SAP has a swelling ratio, and wherein the swelling ratio is about 42 g/g. In even yet another embodiment of the present invention, the recycled SAP has a swelling ratio, and wherein the swelling ratio is about 40 g/g.

In one embodiment of the present invention, the recycled SAP has a CRC, and wherein the CRC is between about 20 g/g and about 45 g/g. In another embodiment of the present invention, the recycled SAP has a CRC, and wherein the CRC is between about 25 g/g and about 40 g/g. In yet another embodiment of the present invention, the recycled SAP has a CRC, and wherein the CRC is between about 30 g/g and about 35 g/g.

In one embodiment of the present invention, the recycled SAP has an AAP, and wherein said AAP is between about 15 g/g and about 40 g/g. In another embodiment of the present invention, the recycled SAP has an AAP, and wherein said AAP is between about 20 g/g and about 35 g/g. In yet another embodiment of the present invention, the recycled SAP has an AAP, and wherein said AAP is between about 25 g/g and about 30 g/g.

VI EXAMPLES

Unless otherwise noted, the SAP used in the EXAMPLES below is denoted as "GIC 31187", came from the Procter & Gamble Co. (Cincinnati, Ohio), was prepared according to the procedure described in the Methods section VII, had particle size between 63 and 150 µm, DN of 68 mol %, and its typical properties are shown in the Methods section VII.

Inventive EXAMPLES 1 to 5 show that the negative logarithm of the viscosity ratio of the product stream to the feed stream (i.e., orders of magnitude reduction in the product stream viscosity relative to the feed stream viscosity) increases with residence time in the LW (no hydrodynamic cavitation) for the 2.5 wt % SAP and 97.5 wt % RO water feed stream. The results from these inventive EXAMPLES are also shown in TABLE 1 and FIG. 1.

Example 1

Figure 5:
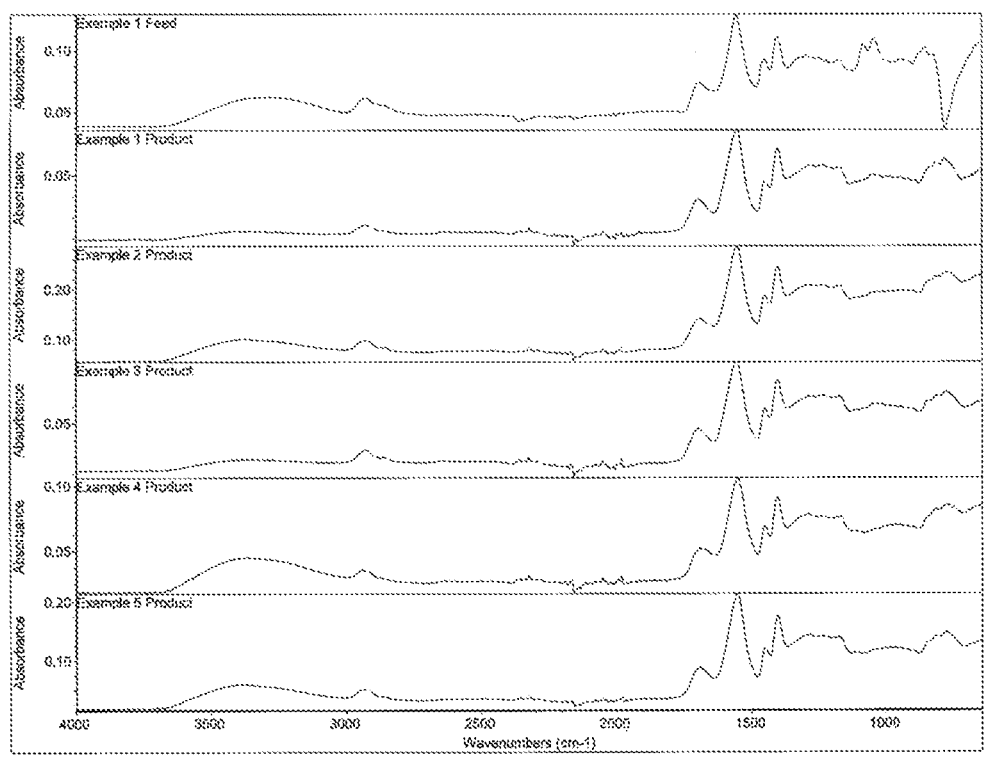
FIG. 5 is a graph showing FTIR spectra of feed stream SAP (EXAMPLE 1) and product stream PAAs (EXAMPLES 1 to 5) acquired by Thermo Scientific™ Nicolet™ iS50 FT-IR Spectrometer (Golden Gate KRS5 ATR with diamond crystal, ZnSe lenses). $COO^-$ (sym) is shown at about 1400 $cm^{-1}$ and $COO^-$ (antisym) is shown at about 1600 $cm^{-1}$ for neutralized PAA; and C=O is shown at about 1700 $cm^{-1}$ for non-neutralized PAA (see Kirwan, L. J., et al., *Langmuir*, 19 (2003), 5802-5807).

SAP was mixed with RO water overnight to produce a feed stream (in the form of a gel) with 2.5 wt % SAP and 97.5 wt % RO water. 400 mL of the feed stream were loaded in the Liquid Whistle apparatus (LW; Model-A Sonolator; Sonic Corp., Stratford, Conn.; ellipsoidal orifice dimensions: width is 2×0.0375 in.=1.9 mm, height is 2×0.012 in.=0.6 mm (hydraulic diameter is calculated as 1.7 mm), land length is 1 mm, and volume V=π×(width)×(height)×(land length)/4=0.9 mm$^3$), run through it with flowrate of about 4899 mL/min and pressure of about 4945 psi (about 341 bar), and the product stream was collected into a beaker. The stainless-steel blade was placed about 10.7 mm away from the LW orifice, and since that distance was more than 6 times the hydraulic diameter of the orifice it was considered that the blade did not cause any significant cavitation. The residence time of the feed stream in the LW was about 4.9 s, and the residence time of the feed stream in the orifice was about 11 μs. At those conditions, the total energy was about 2.10 MJ/kg SAP and the specific energy was 1.36 MJ/kg SAP (thus, the energy efficiency of the LW is about 1.36/2.1=64.8%). The viscosity of the feed and product streams was measured with a parallel plate fixture in oscillatory mode. The complex viscosity of the feed stream at 1 rad/s was measured as 672.4 Pa·s and that of the product stream at 1 rad/s was measured as 109.9 Pa·s. Thus, the viscosity ratio of the two streams was $1.63\times10^{-1}$, and its negative logarithm was 0.79. PAA in the product stream was not decarboxylated as shown in FIG. 5. The PAA in the product stream was analyzed using the MWD Analysis described in the Methods section VII and yielded the following values: $M_n$=1082 kDa; $M_w$=1680 kDa; and PDI=1.6.

Example 2

The feed stream for this EXAMPLE 2 was the product stream of EXAMPLE 1. 400 mL of the feed stream were loaded in the equipment of EXAMPLE 1 and run as a $2^{nd}$ pass with flowrate of about 4899 mL/min and pressure of about 4341 psi (299.3 bar). The residence time of the feed stream in the LW was about 4.9 s. The cumulative (for passes 1 and 2) residence time of the feed stream was about 9.2 s. The total energy was calculated as 1.92 MJ/kg SAP, the cumulative (for passes 1 and 2) total energy was calculated as 4.02 MJ/kg SAP, the specific energy was calculated as 1.20 MJ/kg SAP, the cumulative (for passes 1 and 2) specific energy was calculated as 2.56 MJ/kg SAP, and thus the energy efficiency of the LW for passes 1 and 2 was calculated as 2.56/4.02=63.7%. The viscosity of the product stream was measured with a parallel plate fixture in oscillatory mode, and at 1 rad/s it was measured as 38.7 Pa·s. Thus, the viscosity ratio of the two streams was $5.76\times10^{-2}$, and its negative logarithm was 1.24. PAA in the product stream was not decarboxylated as shown in FIG. 5. The PAA in the product stream had: $M_n$=750 kDa; $M_w$=1120 kDa; and PDI=1.5.

Example 3

The feed stream for this EXAMPLE 3 was the product stream of EXAMPLE 2. 400 mL of the feed stream were loaded in the equipment of EXAMPLE 1 and run as a $3^{rd}$ pass with flowrate of about 4899 mL/min and pressure of about 4195 psi (289.2 bar). The residence time of the feed stream in the LW was about 4.9 s. The cumulative (for passes 1 to 3) residence time of the feed stream was about 13.8 s. The total energy was calculated as 1.89 MJ/kg SAP, the cumulative (for passes 1 to 3) total energy was calculated as 5.91 MJ/kg SAP, the specific energy was calculated as 1.16 MJ/kg SAP, the cumulative (for passes 1 to 3) specific energy was calculated as 3.72 MJ/kg SAP, and thus the energy efficiency of the LW for passes 1 to 3 was calculated as 3.72/5.91=62.9%. The viscosity of the product stream was measured with a parallel plate fixture in oscillatory mode, and at 1 rad/s it was measured as 15.2 Pa·s. Thus, the viscosity ratio of the two streams was $2.26\times10^{-2}$, and its negative logarithm was 1.65. The PAA in the product stream was not decarboxylated as shown in FIG. 5. The PAA in the product stream had: $M_n$=1254 kDa; $M_w$=1566 kDa; and PDI=1.2.

Example 4

The feed stream for this EXAMPLE 4 was the product stream of EXAMPLE 3. 300 mL of the feed stream were loaded in the equipment of EXAMPLE 1 and run as a $4^{th}$ pass with flowrate of about 4899 mL/min and pressure of about 4143 psi (285.6 bar). The residence time of the feed stream in the LW was about 3.7 s. The cumulative (for passes 1 to 4) residence time of the feed stream was about 17.5 s. The LW total energy was calculated as 1.86 MJ/kg SAP, the cumulative (for passes 1 to 4) LW total energy was calculated as 7.77 MJ/kg SAP, the specific energy was calculated as 1.14 MJ/kg SAP, the cumulative (for passes 1 to 4) specific energy was calculated as 4.86 MJ/kg SAP, and thus the energy efficiency of the LW for passes 1 to 4 was calculated as 4.86/7.77=62.5%. The viscosity of the product stream was measured with a cup and bob fixture in steady mode, and at 4 s$^{-1}$ it was measured as 6.31 Pa·s. Thus, the viscosity ratio of the two streams was $9.38\times10^{-3}$, and its negative logarithm was 2.03. The PAA in the product stream was not decarboxylated as shown in FIG. 5. The PAA in the product stream had: $M_n$=1419 kDa; $M_w$=1697 kDa; and PDI=1.2.

Example 5

The feed stream for this EXAMPLE 5 was the product stream of EXAMPLE 4. 300 mL of the feed stream were loaded in the equipment of EXAMPLE 1 and run as a $5^{th}$ pass with flowrate of about 4899 mL/min and pressure of about 4101 psi (282.8 bar). The residence time of the feed stream in the LW was about 3.7 s. The cumulative (for passes 1 and 2) residence time of the feed stream was about 21.2 s. The LW total energy was calculated as 1.85 MJ/kg SAP, the cumulative (for passes 1 to 5) LW total energy was calculated as 9.62 MJ/kg SAP, the specific energy was calculated as 1.13 MJ/kg SAP, the cumulative (for passes 1 to 5) specific energy was calculated as 5.99 MJ/kg SAP, and thus the energy efficiency of the LW for passes 1 to 4 was calculated as 5.99/9.62=62.3%. The viscosity of the product stream was measured with a cup and bob fixture in steady mode, and at 4 s$^{-1}$ it was measured as 3.23 Pa·s. Thus, the viscosity ratio of the two streams was $4.8\times10^{-3}$, and its negative logarithm was 2.32. PAA in the product stream was not decarboxylated as shown in FIG. 5. The PAA in the product stream had: $M_n$=1318 kDa; $M_w$=1653 kDa; and PDI=1.3.

Figure 2:
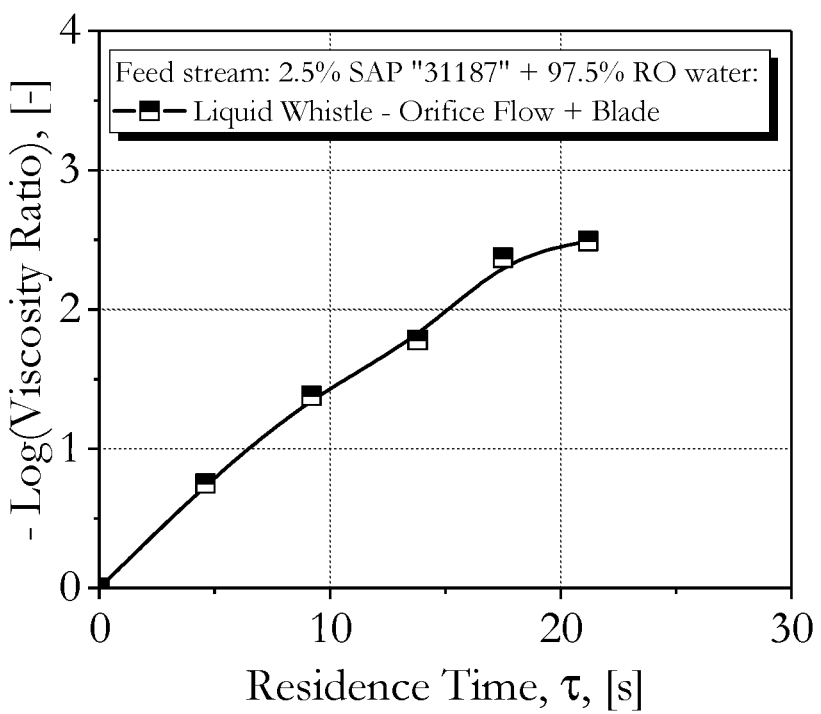
FIG. 2 is a graph showing the negative logarithm of the viscosity ratio between the feed and product streams as a function of the residence time of the feed stream in the Liquid Whistle, with the orifice and hydrodynamic cavitation (i.e., the blade was engaged), and for the 2.5 wt % and 97.5 wt % RO water feed stream.

Inventive EXAMPLES 6 to 10 show that the negative logarithm of the viscosity ratio of the product stream to the feed stream (i.e., orders of magnitude reduction in the product stream viscosity relative to the feed stream viscosity) increases with residence time in the LW (with hydrodynamic cavitation) for the 2.5 wt % SAP and 97.5 wt % RO water feed stream. The results from these inventive EXAMPLES are also shown in TABLE 1 and FIG. 2.

Example 6

Figure 6:
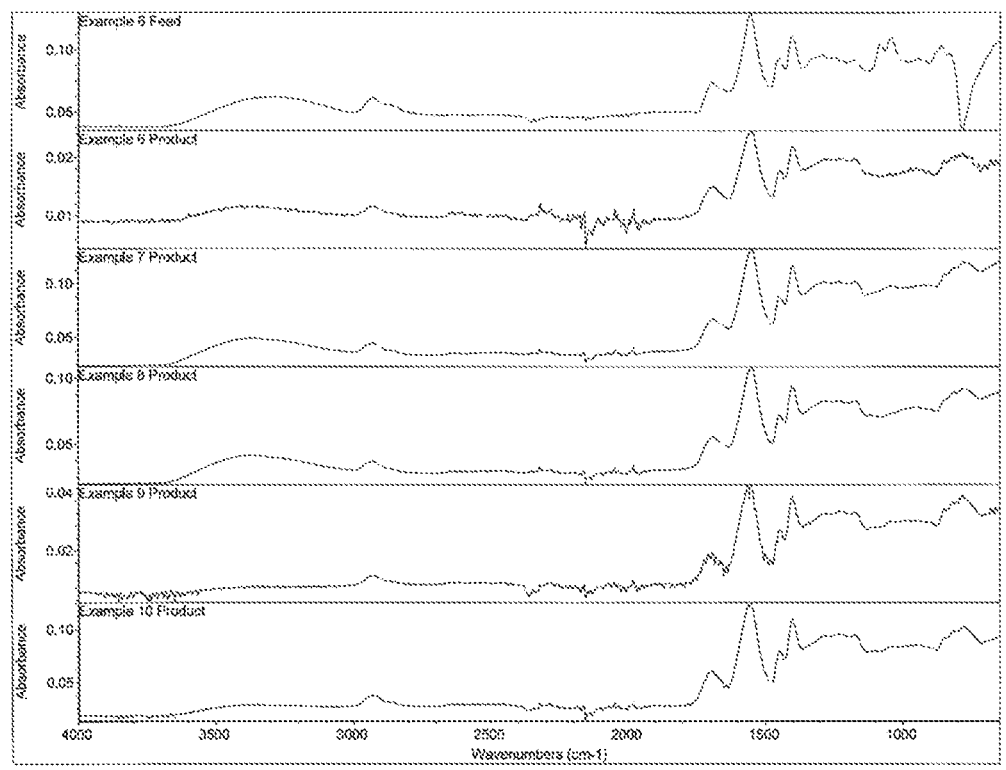
FIG. 6 is a graph showing FTIR spectra of feed stream SAP (EXAMPLE 6) and product stream PAAs (EXAMPLES 6 to 10) acquired by Thermo Scientific™ Nicolet™ iS50 FT-IR Spectrometer (Golden Gate KRS5 ATR with diamond crystal, ZnSe lenses). $COO^-$ (sym) is shown at about 1400 $cm^{-1}$ and $COO^-$ (antisym) is shown at about 1600 $cm^{-1}$ for neutralized PAA; and C=O is shown at about 1700 $cm^{-1}$ for non-neutralized PAA (see Kirwan, L. J., et al., *Langmuir*, 19 (2003), 5802-5807).

The feed stream for this EXAMPLE 6 was the same as the feed stream of EXAMPLE 1, and it was run in the same apparatus and with the same conditions of EXAMPLE 1 (i.e., flowrate, pressure, total energy, and specific energy). The only difference in the apparatus of EXAMPLE 1 was that the stainless-steel blade was placed 0.5 mm away from the LW orifice in this EXAMPLE 6 (i.e., that distance was 0.3 times the hydraulic diameter of the orifice and thus cavitation was expected to happen). The viscosity of the feed and product streams was measured with a parallel plate fixture in oscillatory mode. The complex viscosity of the feed stream at 1 rad/s was measured as 648.2 Pa·s and that of the product stream at 1 rad/s was measured as 115.7 Pa·s. Thus, the viscosity ratio of the two streams was $1.78 \times 10^{-1}$, and its negative logarithm was 0.75. PAA in the product stream was not decarboxylated as shown in FIG. 6. The PAA in the product stream had: $M_n$=646 kDa; $M_w$=939 kDa; and PDI=1.5.

Example 7

The feed stream for this EXAMPLE 7 was the product stream of EXAMPLE 6, and it was run in the same apparatus and with the same conditions of EXAMPLE 2 (i.e., flowrate, pressure, total energy, and specific energy). The only difference in the apparatus of EXAMPLE 2 was that a stainless-steel blade was placed 0.5 mm away from the LW orifice in this EXAMPLE 7. The viscosity of the product stream was measured with a parallel plate fixture in oscillatory mode, and at 1 rad/s it was measured as 26.9 Pa·s. Thus, the viscosity ratio of the two streams was $4.15 \times 10^{-2}$, and its negative logarithm was 1.38. PAA in the product stream was not decarboxylated as shown in FIG. 6. The PAA in the product stream had: $M_n$=814 kDa; $M_w$=1308 kDa; and PDI=1.6.

Example 8

The feed stream for this EXAMPLE 8 was the product stream of EXAMPLE 7, and it was run in the same apparatus and with the same conditions of EXAMPLE 3 (i.e., flowrate, pressure, total energy, and specific energy). The only difference in the apparatus of EXAMPLE 3 was that a stainless-steel blade was placed 0.5 mm away from the LW orifice in this EXAMPLE 8. The viscosity of the product stream was measured with a parallel plate fixture in oscillatory mode, and at 1 rad/s it was measured as 10.8 Pa·s. Thus, the viscosity ratio of the two streams was $1.67 \times 10^{-2}$, and its negative logarithm was 1.78. PAA in the product stream was not decarboxylated as shown in FIG. 6. The PAA in the product stream had: $M_n$=1026 kDa; $M_w$=1498 kDa; and PDI=1.4.

Example 9

The feed stream for this EXAMPLE 9 was the product stream of EXAMPLE 8, and it was run in the same apparatus and with the same conditions of EXAMPLE 4 (i.e., flowrate, pressure, total energy, and specific energy). The only difference in the apparatus of EXAMPLE 4 was that a stainless-steel blade was placed 0.5 mm away from the LW orifice in this EXAMPLE 9. The viscosity of the product stream was measured with a cup and bob fixture in steady mode, and at 4 $s^{-1}$ it was measured as 2.75 Pa·s. Thus, the viscosity ratio of the two streams was $4.24 \times 10^{-3}$, and its negative logarithm was 2.37. The PAA in the product stream was not decarboxylated as shown in FIG. 6. The PAA in the product stream had: $M_n$=1277 kDa; $M_w$=1532 kDa; and PDI=1.2.

Example 10

The feed stream for this EXAMPLE 10 was the product stream of EXAMPLE 9, and it was run in the same apparatus and with the same conditions of EXAMPLE 5 (i.e., flowrate, pressure, total energy, and specific energy). The only difference in the apparatus of EXAMPLE 5 was that a stainless-steel blade was placed 0.5 mm away from the LW orifice in this EXAMPLE 10. The viscosity of the product stream was measured with a cup and bob fixture in steady mode, and at 4 $s^{-1}$ it was measured as 2.1 Pa·s. Thus, the viscosity ratio of the two streams was $3.24 \times 10^{-3}$, and its negative logarithm was 2.49. PAA in the product stream was not decarboxylated as shown in FIG. 6. The PAA in the product stream had: $M_n$=1434 kDa; $M_w$=1703 kDa; and PDI=1.2.

Figure 3:
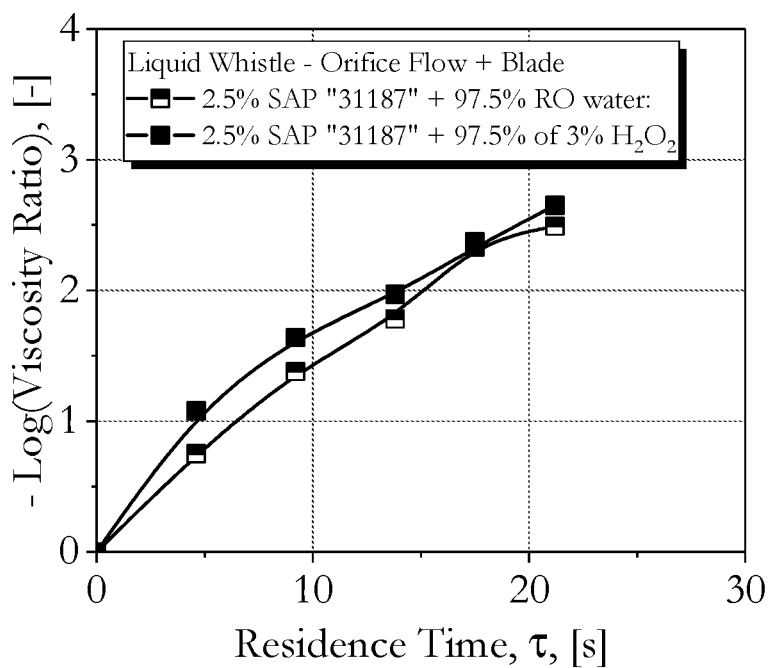
FIG. 3 is a graph showing the negative logarithm of the viscosity ratio between the feed and product streams as a function of the residence time of the feed stream in the Liquid Whistle, with the orifice and hydrodynamic cavitation (i.e., the blade was engaged), and for the feed streams: 2.5 wt % SAP and 97.5 wt % RO water, and 2.5 wt % SAP and 97.5 wt % of 3 wt % $H_2O_2$ solution.

Inventive EXAMPLES 11 to 15 show that the negative logarithm of the viscosity ratio of the product stream to the feed stream (i.e., orders of magnitude reduction in the product stream viscosity relative to the feed stream viscosity) increases with residence time in the LW (no hydrodynamic cavitation) for the 2.5 wt % SAP and 97.5 wt % of a 3 wt % $H_2O_2$ solution. The results from these inventive EXAMPLES are also shown in TABLE 1 and FIG. 3.

Example 11

A feed stream with 2.5 wt % SAP and 97.5 wt % of a 3 wt % hydrogen peroxide solution was prepared as in EXAMPLE 1, and it was run in the same apparatus and with the same conditions of EXAMPLE 1 (i.e., flowrate, pressure, total energy, and specific energy). The viscosity of the feed and product streams was measured with a parallel plate fixture in oscillatory mode. The complex viscosity of the feed stream at 1 rad/s was measured as 628.6 Pa·s and that of the product stream at 1 rad/s was measured as 78 Pa·s. Thus, the viscosity ratio of the two streams was $1.24 \times 10^{-1}$, and its negative logarithm was 0.91. The PAA in the product stream had: $M_n$=373 kDa; $M_w$=624 kDa; and PDI=1.7.

Example 12

The feed stream for this EXAMPLE 12 was the product stream of EXAMPLE 11, and it was run in the same apparatus and with the same conditions of EXAMPLE 2 (i.e., flowrate, pressure, total energy, and specific energy). The viscosity of the product stream was measured with a parallel plate fixture in oscillatory mode, and at 1 rad/s it was measured as 28.6 Pa·s. Thus, the viscosity ratio of the two streams was $4.55 \times 10^{-2}$, and its negative logarithm was 1.34. The PAA in the product stream had: $M_n$=666 kDa; $M_w$=1005 kDa; and PDI=1.5.

Example 13

The feed stream for this EXAMPLE 13 was the product stream of EXAMPLE 12, and it was run in the same apparatus and with the same conditions of EXAMPLE 3 (i.e., flowrate, pressure, total energy, and specific energy). The viscosity of the product stream was measured with a parallel plate fixture in oscillatory mode, and at 1 rad/s it was measured as 10.6 Pa·s. Thus, the viscosity ratio of the two streams was $1.69 \times 10^{-2}$, and its negative logarithm was 1.77. The PAA in the product stream had: $M_n$=833 kDa; $M_w$=1208 kDa; and PDI=1.4.

Example 14

The feed stream for this EXAMPLE 14 was the product stream of EXAMPLE 13, and it was run in the same apparatus and with the same conditions of EXAMPLE 4 (i.e., flowrate, pressure, total energy, and specific energy). The viscosity of the product stream was measured with a parallel plate fixture in oscillatory mode, and at 1 rad/s it was measured as 3.9 Pa·s. Thus, the viscosity ratio of the two streams was $6.20 \times 10^{-3}$, and its negative logarithm was 2.21. The PAA in the product stream had: $M_n$=891 kDa; $M_w$=1239 kDa; and PDI=1.4.

Example 15

The feed stream for this EXAMPLE 15 was the product stream of EXAMPLE 14, and it was run in the same apparatus and with the same conditions of EXAMPLE 5 (i.e., flowrate, pressure, total energy, and specific energy). The viscosity of the product stream was measured with a cup and bob fixture in steady mode, and at 4 $s^{-1}$ it was measured as 2.1 Pa·s. Thus, the viscosity ratio of the two streams was $3.34 \times 10^{-3}$, and its negative logarithm was 2.48. The PAA in the product stream had: $M_n$=967 kDa; $M_w$=1332 kDa; and PDI=1.4.

Figure 4:
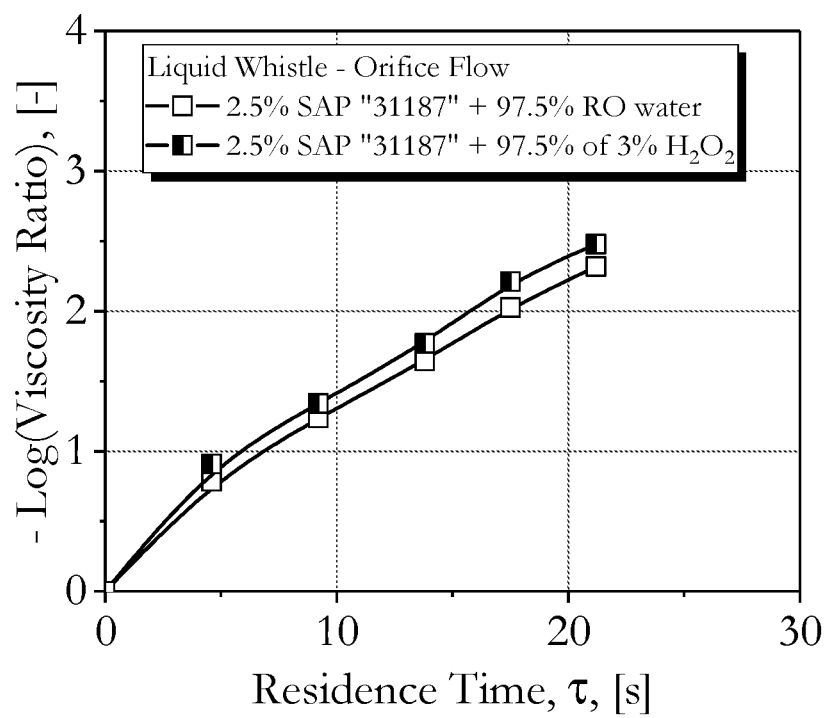
FIG. 4 is a graph showing the negative logarithm of the viscosity ratio between the feed and product streams as a function of the residence time of the feed stream in the Liquid Whistle, with only the orifice and without hydrodynamic cavitation (i.e., the blade was not engaged), and for the feed streams: 2.5 wt % SAP and 97.5 wt % RO water, and 2.5 wt % SAP and 97.5 wt % of 3 wt % $H_2O_2$ solution.

Inventive EXAMPLES 16 to 20 show that the negative logarithm of the viscosity ratio of the product stream to the feed stream (i.e., orders of magnitude reduction in the product stream viscosity relative to the feed stream viscosity) increases with residence time in the LW (with hydrodynamic cavitation) for the 2.5 wt % SAP and 97.5 wt % of a 3 wt % $H_2O_2$ solution. The results from these inventive EXAMPLES are also shown in TABLE 1 and FIG. 4.

Example 16

The feed stream for this EXAMPLE 16 was the same as the feed stream of EXAMPLE 11, and it was run in the same apparatus and with the same conditions of EXAMPLE 6 (i.e., flowrate, pressure, total energy, and specific energy). The viscosity of the feed and product streams was measured with a parallel plate fixture in oscillatory mode. The complex viscosity of the feed stream at 1 rad/s was measured as 628.6 Pa·s and that of the product stream at 1 rad/s was measured as 51.7 Pa·s. Thus, the viscosity ratio of the two streams was $8.11 \times 10^{-2}$, and its negative logarithm was 1.08. The PAA in the product stream had: $M_n$=525 kDa; $M_w$=849 kDa; and PDI=1.6.

Example 17

The feed stream for this EXAMPLE 17 was the product stream of EXAMPLE 16, and it was run in the same apparatus and with the same conditions of EXAMPLE 7 (i.e., flowrate, pressure, total energy, and specific energy). The viscosity of the product stream was measured with a parallel plate fixture in oscillatory mode, and at 1 rad/s it was measured as 14.5 Pa·s. Thus, the viscosity ratio of the two streams was $2.31 \times 10^{-2}$, and its negative logarithm was 1.64. The PAA in the product stream had: $M_n$=792 kDa; $M_w$=1162 kDa; and PDI=1.5.

Example 18

The feed stream for this EXAMPLE 18 was the product stream of EXAMPLE 17, and it was run in the same apparatus and with the same conditions as in EXAMPLE 8 (i.e., flowrate, pressure, total energy, and specific energy). The viscosity of the product stream was measured with a parallel plate fixture in oscillatory mode, and at 1 rad/s it was measured as 6.68 Pa·s. Thus, the viscosity ratio of the two streams was $1.06 \times 10^{-2}$, and its negative logarithm was 1.97. The PAA in the product stream had: $M_n$=1074 kDa; $M_w$=1405 kDa; and PDI=1.3.

Example 19

The feed stream for this EXAMPLE 19 was the product stream of EXAMPLE 18, and it was run in the same apparatus and with the same conditions as in EXAMPLE 9 (i.e., flowrate, pressure, total energy, and specific energy). The viscosity of the product stream was measured with a parallel plate fixture in oscillatory mode, and at 1 rad/s it was measured as 2.96 Pa·s. Thus, the viscosity ratio of the two streams was $4.71 \times 10^{-3}$, and its negative logarithm was 2.33. The PAA in the product stream had: $M_n$=1074 kDa; $M_w$=1406 kDa; and PDI=1.3.

Example 20

The feed stream for this EXAMPLE 20 was the product stream of EXAMPLE 19, and it was run in the same apparatus and with the same conditions as in EXAMPLE 10 (i.e., flowrate, pressure, total energy, and specific energy). The viscosity of the product stream was measured with a cup and bob fixture in steady mode, and at 4 $s^{-1}$ it was measured as 1.4 Pa·s. Thus, the viscosity ratio of the two streams was $2.23 \times 10^{-3}$, and its negative logarithm was 2.65. The PAA in the product stream had: $M_n$=1093 kDa; $M_w$=1391 kDa; and PDI=1.3.

The compositions of the feed streams, experimental conditions, and results from inventive EXAMPLES 1 to 20 are summarized in TABLE 1 below.

TABLE 1

| EXAMPLE # | SAP, [wt %] | RO Water, [wt %] | 3 wt % $H_2O_2$ Solution, [wt %] | # of Passes Through LW, [—] | Hydrodynamic Cavitation in LW? | Specific Energy, [MJ/kg] | −LOG (Viscosity Ratio), [—] |
|---|---|---|---|---|---|---|---|
| 1 | 2.5 | 97.5 | — | 1 | No | 1.32 | 0.79 |
| 2 | 2.5 | 97.5 | — | 2 | No | 2.56 | 1.24 |
| 3 | 2.5 | 97.5 | — | 3 | No | 3.72 | 1.65 |
| 4 | 2.5 | 97.5 | — | 4 | No | 4.86 | 2.03 |

TABLE 1-continued

| EXAMPLE # | SAP, [wt %] | RO Water, [wt %] | 3 wt % H₂O₂ Solution, [wt %] | # of Passes Through LW, [—] | Hydrodynamic Cavitation in LW? | Specific Energy, [MJ/kg] | −LOG (Viscosity Ratio), [—] |
|---|---|---|---|---|---|---|---|
| 5 | 2.5 | 97.5 | — | 5 | No | 5.99 | 2.32 |
| 6 | 2.5 | 97.5 | — | 1 | Yes | 1.32 | 0.75 |
| 7 | 2.5 | 97.5 | — | 2 | Yes | 2.56 | 1.38 |
| 8 | 2.5 | 97.5 | — | 3 | Yes | 3.72 | 1.78 |
| 9 | 2.5 | 97.5 | — | 4 | Yes | 4.86 | 2.37 |
| 10 | 2.5 | 97.5 | — | 5 | Yes | 5.99 | 2.49 |
| 11 | 2.5 | — | 97.5 | 1 | No | 1.32 | 0.91 |
| 12 | 2.5 | — | 97.5 | 2 | No | 2.56 | 1.34 |
| 13 | 2.5 | — | 97.5 | 3 | No | 3.72 | 1.77 |
| 14 | 2.5 | — | 97.5 | 4 | No | 4.86 | 2.21 |
| 15 | 2.5 | — | 97.5 | 5 | No | 5.99 | 2.48 |
| 16 | 2.5 | — | 97.5 | 1 | Yes | 1.32 | 1.08 |
| 17 | 2.5 | — | 97.5 | 2 | Yes | 2.56 | 1.64 |
| 18 | 2.5 | — | 97.5 | 3 | Yes | 3.72 | 1.97 |
| 19 | 2.5 | — | 97.5 | 4 | Yes | 4.86 | 2.33 |
| 20 | 2.5 | — | 97.5 | 5 | Yes | 5.99 | 2.65 |

Inventive EXAMPLE 23 shows that the amount of extractables from SAP, produced by the incorporation of about 4.8% of PAA (part of the product stream; from degraded SAP) into virgin SAP (comparative EXAMPLE 21), was about half of the amount of extractables from SAP, produced by the incorporation of about 5.1% of commercial PAA into virgin SAP (comparative EXAMPLE 22).

Example 21—Comparative 112.7 g of distilled water were charged to a 500 mL round bottom flange neck flask fitted with a 4-port flange lid and water-cooled condenser. The flask was cooled in an ice water bath. 46 g of Acrylic Acid (Cat #213040; 99.5%, low water, stabilized; Beantown Chemical, Hudson, N.H.) were added and stirred with a football shaped magnetic stirrer. 34.73 g of Sodium Hydroxide (Cat #415413; 50% in water; Sigma-Aldrich, St Louis, Mo.) were added in small aliquots, keeping the temperature of the mixture between 17° C. and 30° C. After this addition the ice bath was removed. 0.335 g polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) were dissolved in 0.5 mL of distilled water and added to the flask. 0.0518 g of potassium persulfate (Cat #216224; ACS Reagent>99%; Sigma-Aldrich) and 0.0021 g of hydrogen peroxide (Stabilized, 1%; Kroger; Topical Solution USP) were dissolved in 2.5 mL of distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A11 Basic S1 mill (IKA Works, Inc., Wilmington, N.C.). The ground powder was sieved and the fraction between 152 μm and 508 μm collected and placed in a controlled environment room at 73° F. and 50% relative humidity for 24 h. 1 g of this powder was analyzed for extractable content following EDANA method NWSP 270.0.R2 (15). The amount of extractables for this sample was 5.85%.

Example 22—Comparative 115.54 g of a 2.5 wt % PAA prepolymer solution (SOKA-LAN® PA 1105; ChemPoint Inc., Bellevue, Wash.; made by diluting 10 g of 35 wt % solution to 140 g with distilled water) were charged to a 500 mL round bottom flange neck flask fitted with a 4-port flange lid and water-cooled condenser. The flask was cooled in an ice water bath. 43.18 g of Acrylic Acid (Cat #213040; 99.5%, low water, stabilized; Beantown Chemical) were added and stirred with a football shaped magnetic stirrer. 34.73 g of Sodium Hydroxide (Cat #415413; 50% in water, Sigma-Aldrich) were added in small aliquots, keeping the temperature of the mixture between 17° C. and 30° C. After this addition the ice bath was removed. 0.335 g of polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) were dissolved in 0.5 mL distilled water and added to the flask. 0.0518 g of potassium persulfate (Cat #216224; ACS Reagent>99%; Sigma-Aldrich) and 0.0021 g of hydrogen peroxide (Stabilized, 1%, Kroger, Topical Solution USP) were dissolved in 2.5 mL distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A11 Basic S1 mill (IKA Woks, Inc.). The ground powder was sieved and the fraction between 152 μm and 508 μm collected and placed in a controlled environment room at 73° F. and 50% relative humidity for 24 h. 1 g of this powder was analyzed for extractable content following EDANA method NWSP 270.0.R2 (15). The amount of extractables for this sample was 14.02%.

Example 23

10.54 g of distilled water and 105 g of the product stream of EXAMPLE 10 (i.e., 2.5 wt % PAA solution (with $M_w$ of 1703 kDa) that was produced when the feed stream flowed in the LW and the blade was set 0.5 mm away from the LW orifice) were charged to a 500 mL round bottom flange neck flask fitted with a 4-port flange lid and water-cooled condenser. The flask was cooled in an ice water bath. 43.18 g of Acrylic Acid (Cat #213040; 99.5%, low water, stabilized; Beantown Chemical) was added and stirred with a football shaped magnetic stirrer. 33.08 g of Sodium Hydroxide (Cat #415413; 50% in water; Sigma-Aldrich) mixed with 1.64 g of distilled water was added in small aliquots, keeping the temperature of the mixture between 17° C. and 30° C. After this addition the ice bath was removed. 0.335 g of polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) was dissolved in 0.5 mL distilled water and added to the flask. 0.0518 g of potassium persulfate (Cat #216224; ACS Reagent>99%; Sigma-Aldrich) and 0.0021 g of hydrogen peroxide (Stabilized, 1%, Kroger, Topical Solution USP) were dissolved in 2.5 mL distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A11 Basic S1 mill (IKA Works, Inc.). The ground powder was sieved and the fraction between 150 μm and 500 μm collected and placed in a controlled environment room at 73° F. and 50% relative humidity for 24 h. 1 g of this powder was analyzed for extractable content following EDANA method NWSP 270.0.R2 (15). The amount of extractables for this sample was 7.56%.

The compositions of the SAP and results from EXAMPLES 21 to 23 are summarized in TABLE 2 below.

TABLE 2

| EXAMPLE # | Source of PAA, [—] | PAA, [wt %] | PAA $M_w$, [kDa] | PAA PDI, [—] | Amount of Extractables, [wt %] |
|---|---|---|---|---|---|
| 21 | — | — | — | — | 5.85 |
| 22 | SOKALAN ® PA 110S | 5.1 | 250 | 2.9 | 14.02 |
| 23 | EXAMPLE 10 | 4.8 | 1703 | 1.2 | 7.56 |

Inventive EXAMPLE 26 show that the swelling ratio of SAP, produced by the incorporation of about 5% of PAA (part of the product stream; from degraded SAP) into virgin SAP was about the same as the swelling ratio of virgin SAP (comparative EXAMPLE 24).

Example 24—Comparative 0.5 g to 1 g of dry and unground gel, prepared as in EXAMPLE 11, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 42.0 g/g.

Example 25—Comparative 0.5 g to 1 g of dry and unground gel, prepared as in EXAMPLE 12, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 55.3 g/g.

Example 26

0.5 g to 1 g of dry and unground gel, prepared as in EXAMPLE 13, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 47.5 g/g.

Example 27

SAP (commercially available from the Procter & Gamble Co. and designated as "7 opt") was mixed with RO water, salt, and urea in an agitation tank system (EnSight Solutions, LLC, (Kansas City, Mo.); Likwifier Model LORWWSS; equipped with 25 gallon tank, top mounted scrap surface agitator, bottom 6 hole/3 wing/10 inch rotor-stator high shear impeller with 10 HP side mounted motor) to produce a feed stream (in the form of a gel) with 2.5 wt % SAP, 0.5 wt % salt (NaCl, ≥99% ACS; Catalog #BDH9286; VWR International, LLC; Radnor, Pa.), 0.5 wt % urea (Proteomics grade, 99.5%; Catalog #97063-800; VWR International, LLC; Radnor, Pa.), and 96.5 wt % RO water. The feed stream was fed into the Liquid Whistle apparatus of EXAMPLE 1 (in this EXAMPLE 27, the ellipsoidal orifice had a cross-sectional surface area of about 1.3 mm$^2$) with flowrate of about 8 L/min and pressure of about 4,500 psi (310 bar), and the product stream was recirculated back into the agitation tank system. The tank volume was passed through the LW apparatus about 4 times, representing a total residence time of about 20 ms in the LW chamber region (about 5 ms per pass). The energy density achieved from the mixing device was about 31 MJ/m$^3$ (about 1.24 MJ/kg SAP). After these 4 passes, the concentration of SAP in the tank was increased in an iterative manner in the recirculating system by 2.5 wt % increments. As each concentration level, the resultant stream was recirculated through the LW apparatus for a specific number of passes: the 2.5 wt % SAP stream for 4 passes, the 5 wt % SAP stream for 4 passes, the 7.5 wt % SAP stream for 5 passes, and the 10 wt % SAP stream for 12.5 passes. Thus, the total cumulative number of passes was 25.5. The viscosity of the product stream was measured using the rheometer AR-G2 (TA Instruments; New Castle, Del.), at 25° C., with a cone-plate fixture (with 1° geometry), and in steady mode. The viscosity at 4 s$^{-1}$ of the 2.5 wt % SAP gel after 4 passes through the LW apparatus was measured as 4.83 Pa·s. The viscosity at 4 s$^{-1}$ of the 5 wt % SAP stream after 4 passes through the LW apparatus was measured as 17.3 Pa·s; and that of the 7.5 wt % SAP stream after 5 passes through the LW apparatus was measured as 60.7 Pa·s. The viscosity at 4 s$^{-1}$ of the 10 wt % SAP stream without any passes at that concentration level (however, it was subjected to a total of 13 passes at the other concentration levels) through the LW apparatus was measured as 151.9 Pa·s, that after 4 passes through the LW apparatus was measured as 113.2 Pa·s (with a corresponding negative logarithm of the viscosity ratio equal to about 0.13), that after 8 passes through the LW apparatus was measured as 87 Pa·s (with a corresponding negative logarithm of the viscosity ratio equal to about 0.24), and that after 12.5 passes through the LW apparatus was measured as 65.5 Pa·s (with a corresponding negative logarithm of the viscosity ratio equal to about 0.37).

VII METHODS

SAP "GIC 31187" Preparation

Deionized water with resistance>5 MΩ·cm at 25° C., and ice made from the deionized water are used. A sample of about 100 g of the ice is melted in a 250 mL glass beaker (VWR International Ltd, Leicestershire, UK; part #LENZ07001049) and the conductivity is measured (e.g. via COND 70 INSTRUMENT without CELL, #50010522, equipped with Cell VPT51-01 C=0.1 from XS Instruments (Carpi MO, Italy) or via LF 320/Set, #300243 equipped with TetraCon 325 from WTW (Xylem Inc., Rye Brook, N.Y., USA)) as <1.6 µS/cm at 0° C.

A 20 L resin kettle (equipped with a four-necked glass cover closed with septa, suited for the introduction of a thermometer and syringe needles) is charged with about 8713.2 g of ice prepared as described above. A magnetic stirrer, capable of mixing the whole content (when liquid), is added and stirring is started (e.g. elliptic magnetic stir bar from VWR, part #442-0507). Stirring can take place at 250-600 rpm. 315.6 g of deionized water is taken to dissolve 33.52 g of "PEG700-DA" (e.g. poly(ethylene glycol)-diacrylate with number average molecular weight of about 700 g/mol, from Sigma-Aldrich, CAS #26570-48-9) in a 500 mL glass beaker. The glass beaker with the "PEG700-DA" solution is covered with parafilm and set aside. 250.0 g of deionized water is used to dissolve 5.175 g of "KPS" (potassium persulfate from Sigma-Aldrich, CAS #7727-21-1) in a 500 mL glass beaker. To this solution, about 0.208 g of 1 wt % aqueous solution of hydrogen peroxide (prepared by dilution with deionized water of 30 wt % aqueous hydrogen peroxide solution obtained from Sigma-Aldrich, CAS #7722-84-1) are added. The so-obtained "KPS" solution is closed and set aside. This solution must be used within 6 h of preparation. 50.0 g of deionized water are used to dissolve 1.128 g of ascorbic acid (from Sigma-Aldrich, CAS #50-81-7) in a 100 mL glass vial with a plastic cap. The solution "ascorbic acid" is closed and set aside. 4599.600 g of glacial acrylic acid (GAA, CAS #79-10-7; Acrylic Acid for synthesis, from Merck, #800181) are added to the ice in the resin kettle while stirring is continued. A thermometer is introduced into the resin kettle and in total 3472.600 g of 50 wt % NaOH solution (for analysis, from Merck, #158793, CAS #1310-73-2) and about 250.0 g of ice (prepared from de-ionized water) are added subsequently in portions such that the temperature is in the range of about 15-30° C. The mixture is continuously stirred. The "PEG700-DA" solution is added to the mixture of acrylic acid (AA), NaOH solution, and ice at a temperature of about 15-30° C., while stirring is continued. The vessel that contained the "PEG700-DA" solution is washed twice with deionized water in an amount of about 3% of the "PEG700-DA" solution volume per wash. The wash water of both washing steps is added to the stirred mixture. Deionized water (the remaining amount required to achieve the total amount of (ice+water) of 11887.47 g) is added to the stirred mixture, e.g. ca. 2308.67 g of deionized water. Then, the resin kettle is closed, and a pressure relief is provided e.g. by puncturing two syringe needles through the septa. The solution is then purged vigorously with argon via an injection needle (stainless steel 304 syringe, 36 in. long, size 16 gauge from Sigma-Aldrich, part #Z152404-1EA) at about 0.4 bar while stirring at about 250-600 rpm. The argon stream is placed close to the stirrer for efficient and fast removal of dissolved oxygen. After about minimum 1 h and maximum 2 h of argon purging and stirring, the "ascorbic acid" solution is added to the reaction mixture at a temperature of about 20-25° C. via a syringe while stirring and argon purging is continued. Within 1 min, the "KPS" solution is also added via funnel through one of the 4 necks in the glass cover, which is quickly covered after the addition of "KPS" is completed. After the initiator solutions ("ascorbic acid" and "KPS" solutions) are mixed with the reaction mixture, stirring and argon purging is continued but the purging needle is moved above the reaction mixture and temperature is recorded. As the polymerization starts, indicated by temperature rise in small steps, and more specifically after the gel point, characterized by sudden increase in viscosity, stirring is stopped. The temperature is monitored; typically, it rises from about 23° C. to about 70-95° C. within 60 min. Once the temperature reaches a maximum (the reaction mixture can reach for example up to about 105° C.) and starts dropping, the resin kettle is transferred into a circulation oven (Binder FED 720) and kept at about 60° C. for about 20 h.

After the polymerization completion time in the circulation oven, the latter is switched off and the resin kettle is allowed to cool down to about 20° C. to 40° C. while remaining in the oven. After that, the gel is removed and broken manually or cut with scissors into smaller pieces. The gel is ground with a grinder (X70G from Scharfen with Unger R70 plate system: 3 pre-cutter kidney plates with straight holes at 17 mm diameter), put onto perforated stainless steel dishes (hole diameter 4.8 mm, 50 cm×50 cm, 0.55 mm caliper, 50% open area, from RS; max. height of gel before drying: about 3 cm) and transferred into a circulation oven (e.g. Binder FED 720) equipped with a condensate trap from DAMM (condensation via cooling below dew point via heat exchanger) to dry the circulation air, cooled to 5° C. via a thermostat (Julabo FP 50)) at about 120° C. for about 20 h. The dried gel is then ground using a centrifuge mill (e.g. Retsch ZM 200 with vibratory feeder DR 100 (setting 50-60), interchangeable sieve with 1.5 mm opening settings, rotary speed 8000 rpm). The milled polymer is then sieved via a sieving machine (e.g. AS 400 control from Retsch with sieves DIN/ISO 3310-1 of 150 µm and 710 µm at about 250 rpm for about for 10 min) to a sieve cut which contains >90 wt % of the materials between 150 and 850 µm to obtain the Base Polymer "SK-002-A". The particles passing through the 150 µm sieve were collected under the name "RD 5717". The hereto described procedure is repeated two more times for stockpiling of SAP particles with cut 150-710 µm under the names "SK-002-E" and "SK-002-K", respectively. The corresponding cuts below 150 µm were collected as described for "SK-002-A" and under the names "GIC 31749" and "GIC 30266", respectively. To make the "GIC 31187" material, the materials "RD 5717", "GIC 31749", and "GIC 30266", all with particle size under 150 μm, were combined together and sieved again, as described above, but with sieves DIN/ISO 3310-1 with mesh sizes 63 μm and 150 μm, respectively.

SAP "GIC 31187" Properties

The so obtained SAP material was analyzed for capacity, moisture, and extractable polymer using the Centrifuge Retention Capacity (CRC) test method (EDANA method WSP 241.2.R3), moisture test method (EDANA method WSP 230.2.R3), and extractable polymer (amount of extractables) test method (EDANA method WSP 270.2.R3), respectively. The results were as follows: CRC=50.3 g/g; Moisture=0.3 wt %; and Extractable Polymer=15.03 wt %.

Total Energy Calculations

The total energy is the electric energy that is supplied to the extensional flow device and is based on the voltage and amperage of the device, and the residence time of the feed stream. The extensional flow device typically calculates the total energy from the motor torque and speed, and residence time of the feed stream in the extensional flow device. The total energy per unit mass of SAP is then calculated from the total energy and the amount of SAP that is in the feed stream.

Specific Energy Calculations

The specific energy is the energy dissipated in the feed stream, it is used to convert SAP to PAA, and is based on the pressure drop in the feed stream as it flows through the extensional flow system. As an example, if the pressure drop in the feed stream is 4945 psi (341 bar), the volume of the feed stream is 400 mL, and the feed stream density is 1 g/mL, then the specific energy is calculated as: (341 (bar)× 0.4 (L))/(400 (mL)×0.025 (g SAP/g)×1 (g/mL))=1.36 MJ/kg SAP.

Molecular Weight Distribution (MWD) Analysis

It is done using Gel Permeation Chromatography (GPC) with Multi-Angle Light Scattering (MALS) and Refractive Index (RI) detection. Samples are made at concentration of 1 mg/mL in 0.1M $NaNO_3$/0.02 wt % Sodium Azide ($NaN_3$) with a gentle mixing at room temperature for overnight hydration. Samples are then filtered through a 0.8 μm filter before the GPC-MALS/RI analysis. The absolute MWD distribution is calculated using do/dc value of 0.15.

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for degrading a superabsorbent polymer (SAP) to poly(acrylic acid) (PAA) comprising flowing a feed stream comprising said SAP into an inlet of an extensional flow device and producing a product stream comprising said PAA at an outlet of said extensional flow device; wherein said feed stream comprises said SAP at a concentration greater than about 1 wt %; wherein said feed stream has a residence time in said extensional flow device of less than about 120 s; and wherein said degradation of said SAP to said PAA requires a total energy of less than about 50 MJ/kg SAP.

2. The method of claim 1, wherein said residence time is less than about 60 s.

3. The method of claim 1, wherein said total energy is less than about 16 MJ/kg SAP.

4. The method of claim 1, wherein said feed stream comprises SAP and water.

5. The method of claim 1, wherein said feed stream comprises SAP and hydrogen peroxide.

6. The method of claim 1, wherein said SAP has degree of neutralization (DN) greater than about 50%.

7. The method of claim 1, wherein said SAP has DN between about 65% and about 75%.

8. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 6.

9. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 4.

10. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 2.

11. The method of claim 1, wherein said PAA has a weight-average molecular weight less than about 2,000,000 g/mol.

12. The method of claim 1, wherein said PAA has a weight-average molecular weight less than about 1,000,000 g/mol.

13. The method of claim 1, wherein said PAA has a polydispersity index (PDI) less than about 4.

14. The method of claim 1, wherein said PAA is used to produce a recycled SAP; said SAP comprises PAA at a concentration is less than about 30%.

15. The method of claim 1, wherein said PAA is used to produce a recycled SAP; wherein said recycled SAP has an amount of extractables less than about 15%.

16. The method of claim 1, wherein said PAA is used to produce a recycled SAP; wherein said recycled SAP has a swelling ratio greater than about 45 g/g.

\* \* \* \* \*